Figure 1:
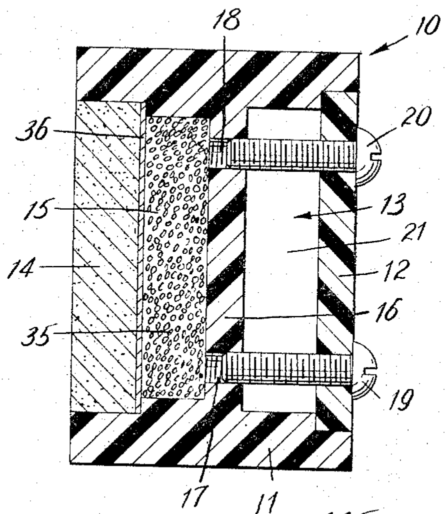

Aug. 22, 1967

R. E. HANSEN 3,337,370

DEFERRED-ACTION ELECTRIC CELL

Filed Oct. 15, 1963

INVENTOR.
ROBERT E. HANSEN

BY

John R Doherty

ATTORNEY

United States Patent Office 3,337,370
Patented Aug. 22, 1967

3,337,370

DEFERRED-ACTION ELECTRIC CELL

Robert E. Hansen, Cleveland, Ohio, assignor to Union Carbide Corporation, a corporation of New York Filed Oct. 15, 1963, Ser. No. 316,301
3 Claims. (Cl. 136—90)

This invention relates to deferred-action electric cells. More particularly, this invention relates to deferred-action electric cells or batteries having a self-contained electrolyte supply.

A primary object of this invention is to provide a compact electric cell that can be stored in the inactive state for extended periods of time without deleterious effects yet that can be readily activated in a minimum amount of time.

A further object of the present invention is to provide a deferred-action electric cell that can be activated from a self-contained electrolyte supply.

Figure 2:
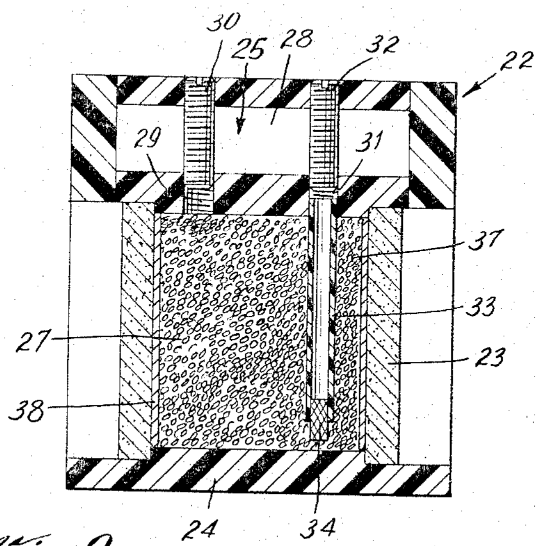

Still other objects will readily present themselves to one skilled in the art upon reference to the specification and the drawing, in which:

FIG. 1 is a cross-sectional elevation of a deferred-action cell provided with a substantially vertical electrolyte reservoir adjacent to the cell, and FIG. 2 is a cross-sectional elevation of a deferred-action cell provided with a substantially horizontal electrolyte reservoir situated above the cell.

The aforesaid objects are achieved by a deferred-action electric cell which comprises a cathode, an anode, and an electrolyte reservoir situated in a spaced relationship to one of the electrodes of the cell i.e., either the cathode or the anode. The electrolyte reservoir and one of the electrodes together form an electrolyte cavity which contains the electrolyte when the cell is in use; i.e., when the cell has been activated. The anode usually is contained within the electrolyte cavity and the cathode usually is the electrode that together with the electrolyte reservoir defines the electrolyte cavity. The electrolyte reservoir is provided with at least two passageways situated in the electrolyte reservoir wall that is adjacent to the electrolyte cavity. The passageways communicate with both the reservoir and the electrolyte cavity and serve to vent the cavity to the reservoir as the electrolyte is introduced into the cavity. The passageways are provided with independent closing and opening means that can be manipulated from without the cell.

Referring particularly to FIG. 1, there is shown an electric cell 10 embodying the invention. Part of the cell casing 11, which can be made of any convenient non-conductive material such as plastic, in conjunction with the cover plate 12 form an electrolyte reservoir 13. The reservoir 13 is spaced from the cell cathode 14 and, together with the casing 11, they define an electrolyte cavity 15. The wall 16 between the reservoir 13 and the electrolyte cavity 15 is provided with two passageways 17 and 18 which communicate between the reservoir 13 and the cavity 15. The passageways 17 and 18 can be opened and closed by the screws 19 and 20, respectively, which are made of a non-conductive material such as nylon, for example.

When the cell is inactive the electrolyte is stored in the reservoir space 21. The electrolyte cavity 15 is partially taken up by anode material 35, particulate in form as shown, or of the plate-type, but the remainder of the cavity is empty. The anode and the cathode are kept apart by a liquid-permeable separator 36. Upon activation, the upper screw 20 is backed off so as to vent the cavity 15 to the reservoir space 21. Thereafter the screw 19 is backed off so as to permit the electrolyte to flow into the cavity 15 and wet the cathode 14 and the anode 35 contained in the cavity 15. During activation the cell may be tilted to facilitate the flow of electrolyte into the cavity 15. Once the transfer of the electrolyte to the cavity 15 is complete, the screws 19 and 20 are adjusted to close the passageways 17 and 18, and the cell is ready for use.

Similarly, in FIG. 2 the cross-sectional elevation of an electric cell 22 shows a semi-annular cathode 23 supported by a non-conductive casing 24. An electrolyte reservoir 25 is situated above the cathode 23. The reservoir 25 together with the cathode 23 and the casing 24 define the electrolyte cavity 27. Anode material 37 is shown within the cavity, separated from the cathode by the separator 38. The reservoir 25 contains the electrolyte initially in the space 28. Upon activation the electrolyte cavity 27 is vented to the reservoir space 28 by means of the passageway 29 and the screw 30. Then the other passageway 31 is opened by backing off the screw 32 and the electrolyte flows down the dip-tube 33 into the cavity 27. In the event a particulate anodic material is employed within the cavity 27, it is preferred to provide a strainer or a screen 34 at the terminal end of the dip-tube 33 so as to prevent the particulate anodic material from entering the dip-tube 33 and clogging it.

The deferred-action electric cells described hereinabove are particularly useful for applications where a compact portable power source that can be stored for extended time periods without deterioration is necessary. Each cell can contain a predetermined amount of electrolyte which is stored together with the cell yet not in contact with the electric current-generating elements. Thus these elements remain at substantially the peak of their effectiveness during storage, and the cell can be placed in service at a moment's notice by simply making an electrolyte transfer from one internal compartment to another.

The features of the present invention have been found to be particularly suitable in oxygen-sensing cells which may comprise an oxygen-depolarizable cathode, a zinc or cadmium anode, and an electrolyte which can be either an aqueous solution of an acid or an acid salt (acidified zinc chloride for example) or a base (potassium hydroxide, for example). However, the present concepts can be equally well utilized in any deferred-action cell that employs a liquid electrolyte.

The foregoing discussion and drawing are intended as an illustration. Many changes in the details of construction and the arrangement of parts described herein may be resorted to without departure from the scope and spirit of this invention.

I claim:

1. A deferred-action electric cell comprising a cathode electrode, and anode electrode and an electrolyte reservoir in spaced relationship to one of the electrodes and an electrolyte cavity, said electrolyte cavity disposed between a wall separating said electrolyte reservoir from said electrolyte cavity and a separator, said separator disposed between said cathode electrode and said anode electrode, the wall of said reservoir being provided with at least two passageways, said passageways connecting said reservoir with said electrolyte cavity, and the passageways venting the electrolyte cavity to the reservoir and being provided with independent opening and closing means.

2. A deferred-action electric cell in accordance with claim 1 wherein a dip tube extends from one passageway into the electrolyte cavity.

3. A deferred-action electric cell in accordance with claim 2 wherein the dip-tube is provided with a strainer at the extremity farthest away from the electrolyte reservoir.

References Cited

UNITED STATES PATENTS

| | | | |
|---|---|---|---|
| 2,674,946 | 4/1954 | Hjelm | 136—90 X |
| 2,787,650 | 4/1957 | Blaru | 136—90 |

WINSTON A. DOUGLAS, *Primary Examiner.*

B. J. OHLENDORF, A. SKAPARS, *Assistant Examiners.*